Patented Sept. 13, 1932

1,877,664

UNITED STATES PATENT OFFICE

DONALD ALBERT HOWES, OF NORTON-ON-TEES, ENGLAND, ASSIGNOR TO IMPERIAL CHEMICAL INDUSTRIES LIMITED, A CORPORATION OF GREAT BRITAIN

PRODUCTION OF LUBRICATING OILS

No Drawing. Application filed January 6, 1932, Serial No. 585,149, and in Great Britain January 5, 1931.

This invention relates to the production of lubricating oils by condensation or polymerization of olefines in the presence of aluminium chloride. I have observed that the poor yields of lubricating oil hitherto obtained by this process are attributable to the fact that the aluminium chloride combines with certain intermediate hydrocarbon products of an unsaturated nature, with the result that its catalytic activity is impaired, and also in effect a certain proportion of the hydrocarbon material is removed from the reaction.

Thus, when an olefine under a pressure of say 20 atmospheres is brought into contact with anhydrous aluminium chloride and the reaction is allowed to proceed at the ordinary temperature, the reaction products consist of "free" oil and a complex of aluminium chloride and "fixed" oil. This fixed oil may be set free by treatment of the complex with ice-cold water, and it appears to consist largely of unsaturated hydrocarbons which are of no value as lubricating oils. If the reaction temperature is raised, the yield of free oil may be increased, but on the other hand, the products are of less value as lubricating oils since the higher the reaction temperature, the lower is the boiling point of the oils produced. Moreover, at higher reaction temperatures the life of the aluminium chloride catalyst is shortened.

I have now found that in a process of the kind described, a high yield of free oil may be obtained while avoiding the formation of fixed oil by employing as catalyst anhydrous aluminium chloride in conjunction with a metal such as aluminium or zinc, such metal being preferably in finely divided form. Preferably the reaction is effected at a temperature of 15° to 20° C., but higher or lower temperatures may be employed if desired, although it must be remembered that the higher the temperature, the lower is the boiling point of the oil produced and in general the less valuable it is as a lubricant. At lower reaction temperatures a longer reaction time should be allowed, or alternatively, the reaction may be accelerated by the use of higher pressures. At temperatures of 15° to 20° C., suitable reaction pressures are from 10 to 50 atmospheres, and a suitable reaction time is from 1 to 10 hours.

Example 1

Seventeen gm. of a mixture of 90 parts of powdered anhydrous aluminium chloride and 10 parts of powdered aluminium metal were placed within an autoclave of 2 liters capacity, and ethylene was pressed in until the pressure rose to 65 atmospheres. The autoclave was then sealed and the temperature maintained at 20° C. for a period of 7 hours, during which time the pressure fell gradually to 23 atmospheres. The liquid contents of the autoclave were then transferred to a still and fractionated, the yield of saturated oil boiling between 150° C. at 3 mm. pressure and 250° C. at 3 mm. pressure suitable for use as a lubricant being 170 gm.

A second experiment performed without the inclusion of aluminium powder but under otherwise identical conditions yielded 87.3 gm. of saturated oil boiling between 150° C. and 250° C. at 3 mm. pressure.

The examples are specific to ethylene, but other olefines may likewise be used. Thus, propylene, butylene and amylene may be substituted for ethylene, although it is preferred that ethylene or propylene or mixtures thereof be used as the initial starting material.

I claim:

1. A process for preparing lubricating oils which comprises passing an olefine taken from the group consisting of ethylene, propylene, butylene and amylene in contact with a catalyst comprising essentially aluminium chloride and a member of the group consisting of aluminium and zinc, then distilling the reaction mixture and removing the saturated oil boiling between 150° C. and 250° C.

2. The process of claim 1 in which the reaction temperature is about 15° to 20° C.

3. The process of claim 1 in which the reaction pressure is about 10 to 50 atmospheres.

4. The process of claim 1 in which the olefine is ethylene.

In testimony whereof, I affix my signature.

DONALD ALBERT HOWES.